UNITED STATES PATENT OFFICE.

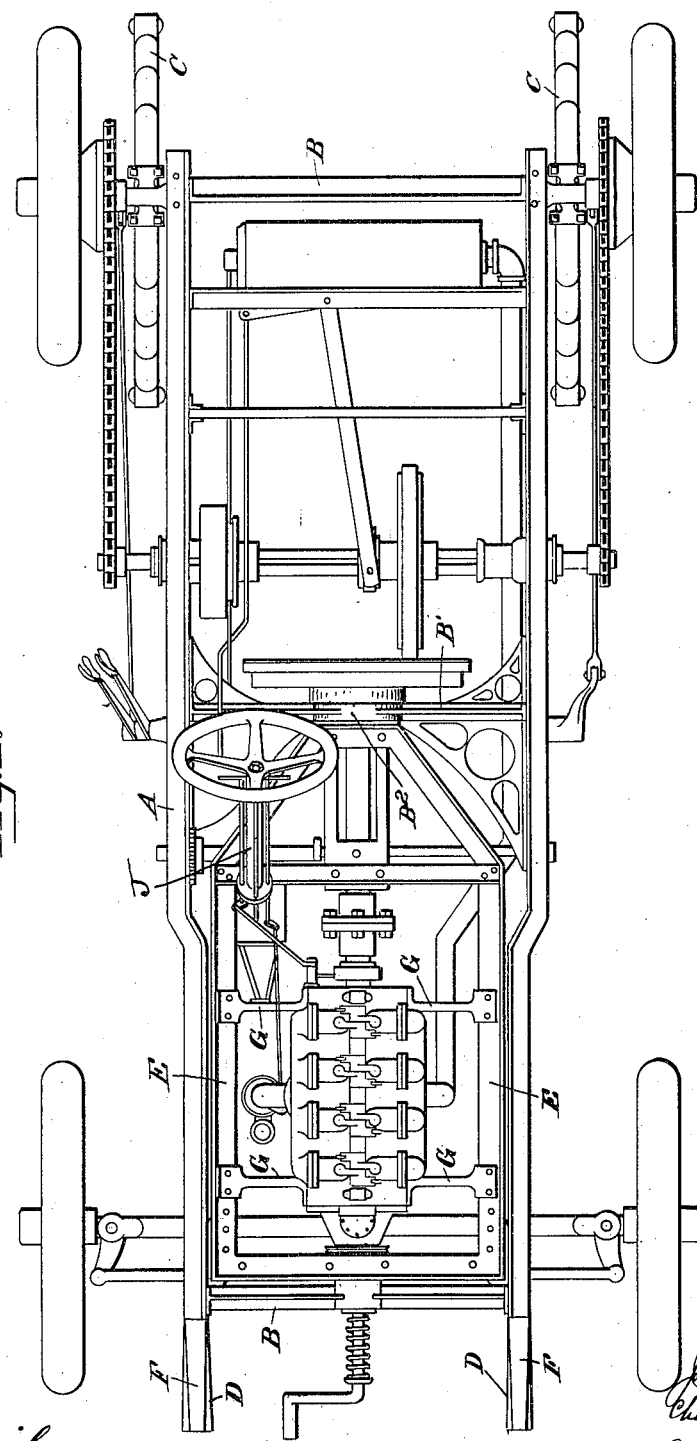

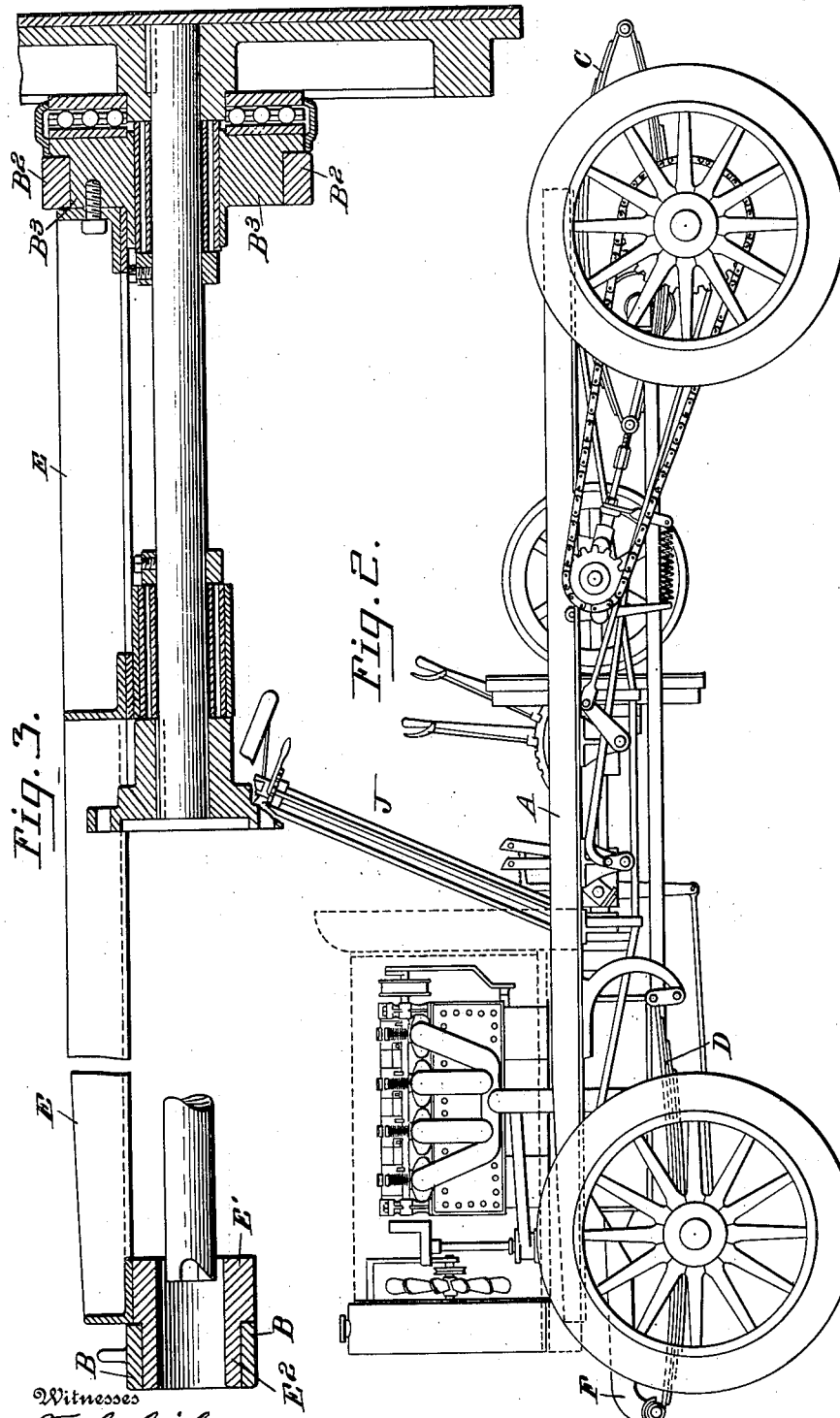

JOHN W. LAMBERT AND CHARLES M. FULLER, OF ANDERSON, INDIANA, ASSIGNORS TO THE BUCKEYE MANUFACTURING COMPANY, OF ANDERSON, INDIANA.

MOTOR-VEHICLE FRAME.

No. 837,477.  Specification of Letters Patent.  Patented Dec. 4, 1906.

Application filed January 23, 1906. Serial No. 297,482.

*To all whom it may concern:*

Be it known that we, JOHN W. LAMBERT and CHARLES M. FULLER, citizens of the United States of America, and residents of Anderson, county of Madison, State of Indiana, have invented certain new and useful Improvements in Motor-Vehicle Frames, of which the following is a full and clear specification, reference being had to the accompanying drawings, in which—

Figure 1 is a plan, and Fig. 2 a side elevation, of a motor-vehicle running-gear, showing our invention. Fig. 3 is a vertical longitudinal sectional view taken through the pivots of the engine-frame.

The object of this invention is to provide improved engine-supporting means which will practically entirely eliminate the well-known and very objectionable strains on the engine frame and shaft due to the twisting or distortion of the body-carrying frame when encountering inequalities in the road-bed.

To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout the several views.

Referring to the drawings annexed by reference characters, A designates the usual chassis-frame, connected at its ends by cross-bars B and intermediate its ends, at about midway the length of the vehicle, by cross-bar B'. At its rear end this frame is supported on the rear or driving axle by elliptical springs C and near its forward end by the rearward extensions of semi-elliptical springs D, attached to the front axle.

The motor-support consists of an open rigid frame E, of a width and length to fit freely within the forward half of the main frame. The forward end of this frame is supported at its respective forward corners upon the front ends of the springs D, suitable bracket-arms F being bolted to the under side of the frame and extending forward and downward to the forward ends of the springs. As the springs D are located directly under the side bars of the main frame in order to obtain the desired width of bearing on the axle, the bars F are curved outward sufficiently to bring them just over the forward extensions of the springs, as shown. As the half-springs D are rigidly secured to the axle, the opposite ends thereof are really independent springs, so that the forward ends of the two frames are supported upon independent resilient supports. The forward end of the engine-frame is also supported by a tubular pivot E', which is carried by a tubular casting bolted to the under side of the engine-frame and is journaled in a ring-bearing carried by the front cross-bar of the main frame. By making this pivot and its support tubular permits the insertion of the starting-crank to engage the forward end of the engine-shaft.

The engine is rigidly supported directly in the center of the subframe E by brackets G, attached to its respective side bars. The engine is preferably of the vertical multicylinder type, and its shaft extends horizontally rearwardly to a point behind the middle cross-bar B', where it has attached to it the fly-wheel of a friction-drive of a well-known type. The rear end of the subframe is pivotally supported on the cross-bar B' by means of a ring-bearing journaled in a circular bearing $B^2$, formed in the cross-bar, the axis of this ring-bearing being coincident with the axis of the engine-shaft, so that the subframe is free to oscillate to a limited extent around the shaft as a center.

The steering-column J is rigidly affixed to the subframe, and its shaft is connected to the steering-rods in the usual manner.

It will be observed that the engine-frame is supported at its rear end by a single pivotal connection to the main frame and at its forward end by a pivotal connection with the main frame and in addition by the springs. In this way this subframe has but two points of direct connection to the main frame, and this connection is made at the approximate longitudinal center of the main frame, where the strains due to distortion of the main frame are practically nil. By making these connections horizontal pivots having axes coincident with the axial center of the drive-shaft and mounting the forward corners of the subframe resiliently upon independent resilient supports the frame is free to tilt in either direction around the shaft as a center and wholly independently of the main frame, thus relieving the engine and its shaft of practically all strains due to distortion of the main frame.

Owing to the fact that the engine-frame has its main connection to the main frame at the middle cross-bar, this cross-bar is made heavier than usual and is suitably braced at its ends where it connects with the side bars of the main frame. The usual ball thrust-bearings are provided on this cross-bar for the drive-disk fly-wheel. This manner of supporting the engine is peculiarly beneficial when used with a friction-gearing, as is obvious.

It will be apparent to those skilled in the art that various mechanical embodiments of the invention are possible, and we therefore do not wish to be limited to the exact arrangement and construction shown.

What we claim, and desire to secure by Letters Patent, is—

1. In a motor-vehicle, the combination of a main frame supported resiliently on the axles and having a rigid cross-bar about midway its length, this cross-bar carrying a ring-bearing about midway its length, an engine having its shaft extending horizontally rearward through said ring-bearing, a frame supporting the engine and provided at its rear end with a ring-pivot having a horizontal pivotal action in said bearing in the cross-bar, the axis of this pivot being approximately coincident with the axial center of the engine-shaft, and a spring supporting each forward corner of the subframe on the front axle.

2. In a motor-vehicle, the combination of the main frame resiliently mounted on axles and wheels, said frame being provided with a cross-bar about midway its length, an engine-supporting subframe having its rear end pivotally connected to said cross-bar and its forward end pivotally connected to the main frame and resiliently supported on the front axle.

3. In a motor-vehicle, the combination of a main frame resiliently mounted on axles and wheels, and an engine-carrying subframe having a one-point connection at each end with said main frame and a two-point resilient connection at one end with one of the axles.

4. In a motor-vehicle, the combination of a main frame resiliently mounted on axles and wheels, and an engine-supporting subframe mounted within the main frame and having at one end a pivotal connection thereto and at its other end a resilient two-point connection with one of the axles.

5. In a motor-vehicle, the combination of a main frame resiliently supported and a subframe for the engine, this subframe having but a single point of direct connection at its rear end with the main frame this connection being a pivotal one and being at the transverse center of said subframe, and springs supporting the forward end of this subframe upon the front axle.

6. In a motor-vehicle, the combination of a main frame resiliently supported and an engine-supporting subframe within the main frame and having its rear end pivotally connected to the main frame directly, the axis of this pivot being horizontal, and the forward end of the subframe being supported at its respective corners upon springs attached to the front axle and also by a horizontal central pivotal connection to the front cross-bar of the main frame.

In testimony whereof we hereunto affix our signatures, in the presence of two witnesses, this 23d day of December, 1905.

JOHN W. LAMBERT.
CHAS. M. FULLER.

Witnesses:
G. A. EITELMANN,
GLAD. S. KING.